Dec. 26, 1933.                J. L. CREVELING                 1,941,137
                              LUBRICATING DEVICE
                             Filed March 6, 1933
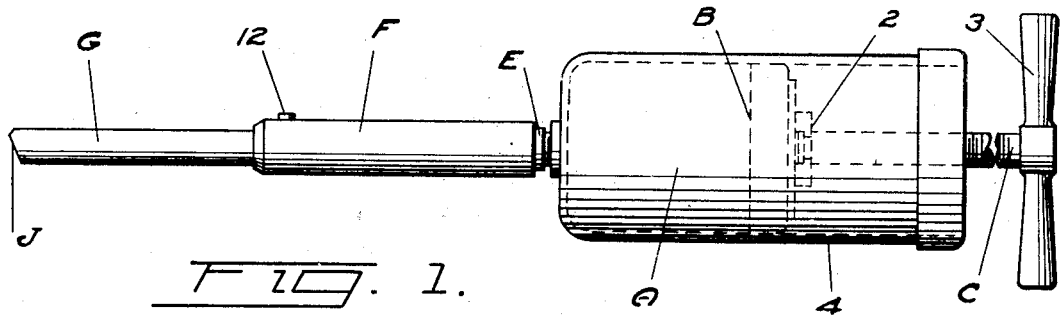
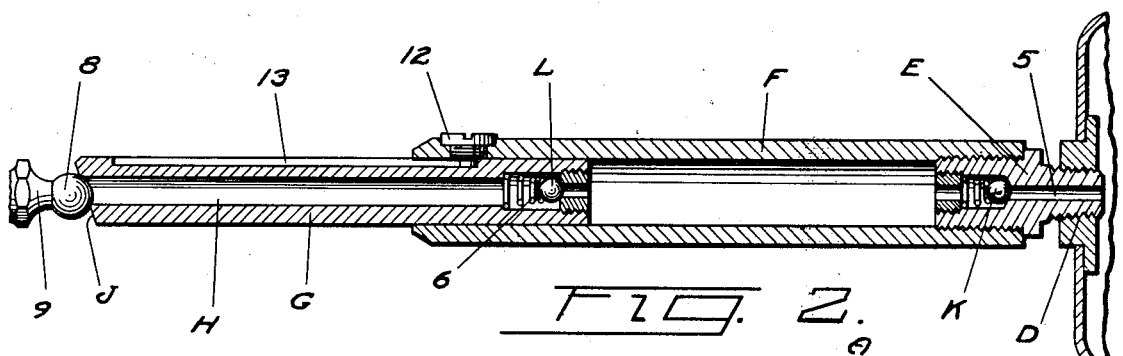
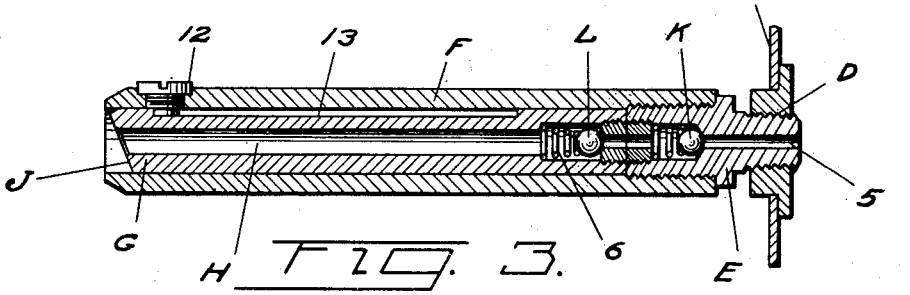
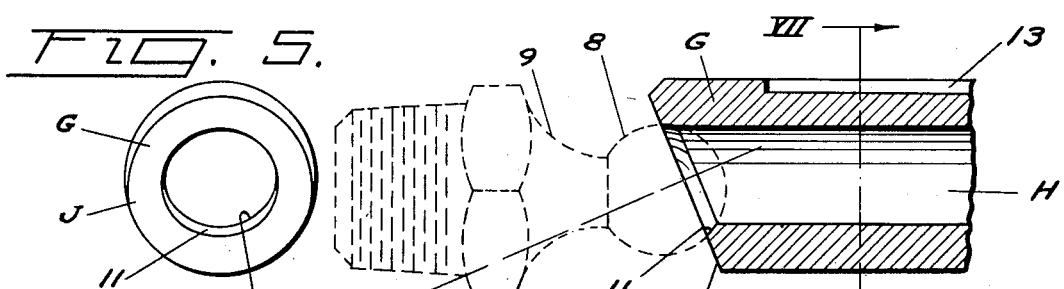
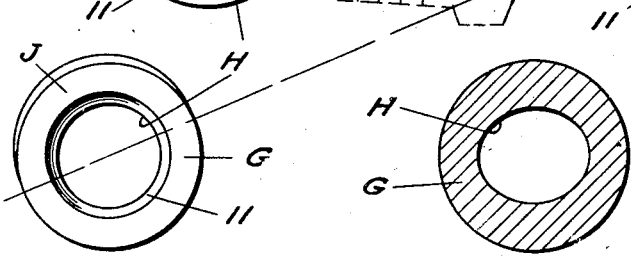
INVENTOR.
JOHN L. CREVELING
BY
ATTORNEY.

Patented Dec. 26, 1933

1,941,137

UNITED STATES PATENT OFFICE 1,941,137

LUBRICATING DEVICE

John L. Creveling, near Tucson, Ariz., assignor to The Lubrication Corporation, Chicago, Ill., a corporation of Delaware Application March 6, 1933. Serial No. 659,641

13 Claims. (Cl. 221—47.4)

This invention relates to improvements in lubricating devices and, more particularly, to pressure feed devices for hand lubricant guns or compressors.

An object of the invention is to provide a high pressure lubricant feeding device which may be attached at will to the discharge end of a hand lubricant compressor or other relatively low pressure lubricant dispensing apparatus wherein the compressor or dispensing apparatus may serve as a charging means for the high pressure device and as a medium through which manual thrust may be transmitted thereto for the operation of the high pressure mechanism of the device during a servicing operation.

Another object is to provide a pressure feed lubricating device having a plunger provided with a discharge outlet at its outer end which, when not in use, may be entirely housed and protected within the barrel of the device, and which during the charging operation is automatically projected into its initial operative position.

A further object is to provide a pressure feed lubricating device affording a novel fitting engaging contact outlet possessing the feature of reformation of its inclined fitting contact surface by the grinding away of the outer end of the plunger in a plane parallel with its original face.

Other objects, the advantages, and uses of the invention, will be apparent after reading the following description and claims and after consideration of the accompanying drawing forming a part of this specification, in which:

Fig. 1 is a side elevation of a hand lubricant compressor equipped with a pressure feed lubricating device constructed in accordance with the invention;

Fig. 2 is a sectional elevation of the lubricant feeding device illustrated in Fig. 1 with the plunger projected outwardly;

Fig. 3 is a view similar to Fig. 2 with the plunger in its retracted position;

Fig. 4 is an enlarged fragmentary sectional view of the discharge end of the plunger illustrating the outlet construction;

Fig. 5 is an end elevation of the plunger of Fig. 4;

Fig. 6 is a plane view of the discharge outlet of the plunger and;

Fig. 7 is a sectional view along the line of VII—VII, Fig. 4.

In general, the apparatus selected for illustration herein comprises, a hand lubricant compressor A including a piston B, a piston operating screw C, and an internally threaded discharge passageway D, within which an externally threaded bushing E providing the inlet port for the pressure feed lubricating device is receivable, a barrel F forming the pressure cylinder for the feeding device, a tubular plunger G mounted for reciprocation within the barrel F having a bore H therethrough, elliptical in cross section, and presenting a fitting engaging face J disposed in a plane inclined with respect to the axis of the plunger at an angle such as to present the mouth of the bore H in circular outline at its intersection of the face J. The feeding device further may include an inlet check valve K and a discharge check valve L, both of the spring pressed ball type, located within the passageway of the bushing E and at the inner end of the plunger G, respectively.

The hand lubricant compressor A may be of the type commonly employed for feeding lubricant under relatively low pressures into lubricant receiving fittings such as employed on automobile chassis and machinery parts. The piston B of the compressor is preferably mounted upon the inner end of screw C by a swivel connection indicated at 2. The outer end of screw C may be formed with a transversely disposed hand grip 3 by means of which the screw may be manually turned to cause it to advance inwardly of the cylindrical body 4 of the compressor so as to urge lubricant through the discharge opening D, the passageway 5 of the bushing E, and into the cylinder F at the rear of the plunger G. The normal position of the elements of the lubricant feeding device, when not in use, is that shown in Fig. 3 with the plunger G entirely retracted within the barrel or cylinder F so as to leave the fitting engaging portion of the plunger unexposed. As lubricant under pressure is forced from the compressor into the cylinder F the plunger G will be urged outwardly to the position shown in Fig. 2 by virtue of the force exerted upon the ball of the check valve L through the medium of its spring 6. This function of the feeding device serves to place the plunger in position for initial operation; i. e.: its power stroke, at which time the cylinder F is fully charged with lubricant. The inlet check valve K prevents the return of the charge into the compressor under the higher pressures developed during the subsequent power stroke of the plunger.

When the operator has thus charged the cylinder of the feeding device the outer end of the plunger G may be engaged with the spherical head 8 of a lubricant receiving fitting 9 so as to form an annular metal to metal contact seal therewith, as shown in Fig. 4. Manual thrust applied to the compressor cylinder 4 or to the handle 3 thereof, with the parts thus assembled and applied to the fitting, will cause the telescoping of the plunger G within the cylinder F to displace lubricant under relatively high pressure from the cylinder through the valve L and the plunger bore H into the fitting 9, and therefore into the bearing or other mechanical part with which the fitting is associated. At the end of a full pressure stroke the parts are again in the position shown in Fig. 3 preparatory to a further charging and discharge cycle which may be repeated as often as desired to meet the demands of the bearing or other mechanism to be lubricated.

With reference to Figs. 4 to 7, inclusive, it may be seen that there is provided by the elliptical bore H, extending through the plunger G and intersecting the inclined fitting engaging surface J one of the distinguishing features of the invention wherein a reformation of the annular fitting engaging portion of the plunger may be brought about by the mere grinding away of the outer end of the plunger in a plane parallel with the surface J. It has heretofore been the practice in the construction of discharge nozzles to employ a bore H for the discharge nozzle the walls of which are circular in cross section, and therefore in order to provide the advantages of a fitting engaging contact surface inclined with respect to the axis of the nozzle various methods have been resorted to the most common of which has been the formation of a counter bore or pocket at the end of the nozzle bore on an axis perpendicular to the contact surface and intersecting the axis of the bore of the nozzle. This former construction is one which involves additional cost in manufacture as well as curtailing within narrow limits the practicability of the refacing of the fitting engaging contact surface. In the present device the extent to which the surface may be refinished by progressive grinding away of plunger end is greatly increased. If desired, a spherical cutting tool may be employed subsequent to the formation of the surface J to provide a narrow spherical surfaced annular counter bore 11 within the bore H to increase the contact area between the plunger and the fitting head although it has been found that in practice constant application of the bore to the fitting head during the servicing operation provides a sufficient "lapping in" of that region of the bore.

A stud screw 12 projected through the side wall of cylinder F and extended into a keyway 13 formed along the outer wall of the plunger G may be employed to limit the travel of and to preclude the rotation of plunger G relative to the cylinder F and compressor A, thus enabling the operator to more readily locate the nozzle upon the fitting.

It is to be understood that the described embodiments of the invention herein set forth are presented for the purpose of illustration only, and various changes may be made therein without departing from the spirit and scope of the invention.

I claim:

1. A lubricating device comprising, a pressure cylinder, means for admitting lubricant to said cylinder, and a tubular plunger mounted for reciprocation in said cylinder, the bore of said plunger being elliptical and intersecting the outer end wall of said plunger at an angle thereto such as to cause the mouth of the bore to follow the contour of a perfect circle.

2. In a lubricating device, a tubular plunger having an elliptical bore intersecting the outer end wall of the plunger at an angle thereto such as to cause the mouth of the bore to follow the contour of a perfect circle.

3. In a lubricating device, a tubular member formed with an elliptical bore, said member being truncated at an angle to the axis of the bore such as to cause the mouth of the bore to follow the contour of a perfect circle.

4. In a lubricating device, a lubricant discharge tube having an elliptical bore therethrough and formed at its outer end with a face inclined with respect to the longitudinal axis of the tube, said bore intersecting said end face at an angle such as to cause the mouth of the bore to follow the contour of a perfect circle.

5. A lubricating device comprising a pressure cylinder, means for admitting lubricant to said cylinder, and a tubular plunger mounted for reciprocation in said cylinder, said plunger being entirely retractible within said cylinder, the bore of said plunger being elliptical and intersecting the outer end wall of said plunger at an angle thereto such as to cause the mouth of the bore to follow the contour of a perfect circle.

6. A lubricant feeding device comprising a cylinder and a tubular plunger mounted for reciprocation in said cylinder terminating at its outer end in an angularly disposed face with a discharge opening for engagement with a lubricant receiving fitting, said plunger being of no greater diameter than the internal diameter of said cylinder whereby the entire plunger may enter said cylinder when fully retracted, said cylinder having an inlet port located at its innermost end.

7. In combination a lubricant compressor, a cylinder rigidly mounted on said compressor and communicating at its inner end with the discharge port of said compressor, and a tubular plunger mounted for reciprocation in said cylinder terminating at its outer end in an angularly disposed face with a discharge outlet therein the maximum external diameter of said plunger being less than the internal diameter of said cylinder whereby the entire plunger may enter the cylinder when the plunger is fully retracted therein.

8. A lubricating device comprising, a pressure cylinder, means for admitting lubricant to said cylinder, a tubular plunger mounted for reciprocation in said cylinder, the bore of said plunger being elliptical and intersecting the outer end wall of said plunger at an angle thereto such as to cause the mouth of the bore to follow the contour of a perfect circle, and a check valve located in the bore of said tubular plunger arranged to open under a predetermined minimum pressure to admit lubricant to the bore of said plunger.

9. In combination a lubricant compressor, a cylinder rigidly mounted on said compressor and communicating at its inner end with said compressor, and a tubular plunger mounted for reciprocation on said cylinder terminating at its outer end in a discharge orifice the maximum external diameter of said plunger being less than the internal diameter of said cylinder whereby the active plunger may enter the cylinder when the plunger is fully retracted therein, the outer end wall of said plunger being located in a plane inclined with respect to the longitudinal axis of the plunger.

10. In a lubricating device, a discharge tube having a longitudinal bore therethrough and being formed with an inclined forward end wall, the mouth of said bore being circular and lying in the plane of said end wall and having its center point located upon the axis of said bore.

11. A lubricating device for servicing a lubricant receiving fitting, comprising a tubular member having its outer end wall inclined with respect to the longitudinal axis of said member, said end wall having a circular discharge orifice therethrough the walls of which are adapted for engagement with said fitting to form a seat therewith, the axis of said orifice being common to the axis of said tubular member.

12. In combination, a lubricant compressor including a low pressure cylinder, a low pressure piston in said cylinder, and means for moving said piston against the lubricant in said cylinder, a high pressure cylinder adapted to be supported on said compressor cylinder in longitudinal alignment therewith, means for establishing communication in one direction between the low and high pressure cylinders, a tubular plunger telescopically mounted in said high pressure cylinder having a discharge opening at its outer end and a check valve in said plunger adapted to admit lubricant from said high pressure cylinder to said opening under pressure exceeding a predetermined minimum value, whereby the charging of said high pressure cylinder may act to project said plunger outwardly thereof.

13. In combination, a lubricant compressor including a low pressure cylinder, a low pressure piston in said cylinder, and means for moving said piston against the lubricant in said cylinder, a high pressure cylinder adapted to be supported on said compressor cylinder in longitudinal alignment therewith, means for establishing communication in one direction between the low and high pressure cylinders, a tubular plunger telescopically mounted in said high pressure cylinder having a discharge opening at its outer end and a check valve in said plunger adapted to admit lubricant from said high pressure cylinder to said opening under pressure exceeding a predetermined minimum value, whereby the charging of said high pressure cylinder may act to project said plunger outwardly thereof, said discharge opening being formed by truncating the outer end of said plunger in a plane inclined with respect to the longitudinal axis thereof.

JOHN L. CREVELING.